United States Patent

Ohasi et al.

[11] Patent Number: 5,263,511
[45] Date of Patent: Nov. 23, 1993

[54] FUEL TANK FOR VEHICLE

[75] Inventors: Tamiyosi Ohasi; Hisao Hanabusa, both of Inazawa; Osamu Hokari, Kanagawa, all of Japan

[73] Assignees: Toyoda Gosei Co., Ltd., Nishikasugai; Isuzu Motors Limited, Tokyo, Japan

[21] Appl. No.: 870,466

[22] Filed: Apr. 17, 1992

[30] Foreign Application Priority Data

Apr. 18, 1991 [JP] Japan .................... 3-086421
Dec. 13, 1991 [JP] Japan .................... 3-330468

[51] Int. Cl.⁵ .................................................. B65B 31/00
[52] U.S. Cl. ...................................... 137/588; 141/59; 141/302; 251/65
[58] Field of Search ............... 137/588; 141/59, 302; 251/65

[56] References Cited

U.S. PATENT DOCUMENTS

| | | | |
|---|---|---|---|
| 4,040,458 | 8/1977 | Hansel | 141/DIG. 1 |
| 4,060,110 | 11/1977 | Bower | 141/DIG. 1 |
| 4,195,673 | 4/1980 | Johnston et al. | 141/DIG. 1 |
| 4,649,970 | 3/1987 | Bower et al. | 141/59 |
| 4,651,889 | 3/1987 | Uranishi et al. | 137/588 |
| 4,659,346 | 4/1987 | Uranishi et al. | 123/519 |
| 4,701,198 | 10/1987 | Uranishi et al. | 123/519 |
| 4,724,861 | 2/1988 | Covert et al. | 137/588 |
| 4,765,504 | 8/1988 | Sherwood et al. | 141/59 |
| 5,022,433 | 6/1991 | Jansky et al. | 137/588 |
| 5,090,459 | 2/1992 | Aoki et al. | 141/59 |

FOREIGN PATENT DOCUMENTS

63-119420 8/1988 Japan .

*Primary Examiner*—A. Michael Chambers
*Attorney, Agent, or Firm*—Cushman, Darby & Cushman

[57] ABSTRACT

A fuel tank comprising a filler tube, a communication passage, a charcoal canister, a cover member, a first magnetic member, and a second magnetic member along with the body of the tank. The filler tube is mounted at the top of the body of the tank. The canister is installed inside the communication passage connected with the filler tube. The cover member covers the top of the filler tube. The first magnetic member is disposed inside the filler tube and has a valve portion which opens and closes the communication passage. The second magnetic member is disposed outside the filler tube, and is moved when the cover member is opened or closed. The magnetic force produced by the second magnetic member can move the first magnetic member.

8 Claims, 9 Drawing Sheets

FUEL TANK FOR VEHICLE

BACKGROUND OF THE INVENTION

1. Field of the Invention

The present invention relates to a fuel tank installed in an automobile or other vehicle and, more particularly, to a vehicular fuel tank capable of preventing escape of fuel vapors into the atmosphere when fuel is being supplied into the tank.

2. Description of the Prior Art

For the conventional fuel tank of this kind, when the amount of the fuel remaining in the tank becomes small, the space above the fuel level is permeated with a large amount of fuel vapor. Therefore, the fuel tank is required to prevent the escape of the fuel vapors into the atmosphere when fuel is being supplied into the tank.

In order to satisfy this requirement, the conventional fuel tank is provided with a communication passage that is in communication with the charcoal canister. This passage is opened when the filler lid or filler cap is opened. In this structure, the fuel vapors can be guided into the canister by opening the cover member such as the filler lid.

In some fuel tanks the aforementioned communication passage is opened when the filler lid is taken off. A fuel tank described in Japanese Utility Model Laid-Open No. 119420/1988 utilizes a solenoid valve. Another fuel tank described in U.S. Pat. No. 4,659,346 makes use of a wire.

Where the solenoid valve is used, the cost is increased. Where the wire is employed, it is necessary that the shaft of the valve connected to the front end of the wire have a seal for isolating the inside of the tank from the atmosphere. In this structure, therefore, the seal is worn away by movement of movable members such as the wire. Hence, the lifetime of the seal is shortened. This leads to a deterioration in the reliability of the fuel tank.

A further known fuel tank in which the communication passage is opened when the filler cap is taken off uses a control valve for opening and closing the passage. This control valve which makes use of a coil spring to mechanically open and close the passage is mounted in the filler tube, as described in U.S. Pat. No. 4,651,889.

This control valve makes direct contact with the filler cap inside the filler tube and moves with the cap. This necessitates a seal around the control valve to isolate the inside of the tank from the atmosphere. Since this seal is kept in contact with the moving control valve, the seal is worn away. Consequently, the reliability including the life is poor.

SUMMARY OF THE INVENTION

It is an object of the present invention to provide a fuel tank which is installed in a vehicle, simple in structure, and capable of opening the communication passage when the cover member of the filler tube such as a filler lid or filler cap is removed.

It is another object of the invention to provide a fuel tank which is installed in a vehicle and can be economically fabricated though the tank is provided with a mechanism for opening the communication passage.

It is a further object of the invention to provide a fuel tank which is installed in a vehicle and has a reliable seal though the tank is equipped with a mechanism for opening the communication passage.

The above objects are achieved in accordance with the teachings of the invention by a fuel tank for use in a vehicle, said fuel tank comprising: a filler tube disposed at the top of the body of the fuel tank; a communication passage connected with the filler tube; a charcoal canister installed in the communication passage; a cover member that covers the top of the filler tube; a first magnetic member disposed inside the filler tube and having a valve portion that opens or closes the communication passage according to movement of the first magnetic member; and a second magnetic member which is disposed outside the filler tube, moves when the cover member is opened or closed, and is capable of moving the first magnetic member with a magnetic force.

In the novel vehicular fuel tank, when the cover member is opened or removed, the second magnetic member is first moved. Then, the first magnetic member which magnetically attracts or repels the second magnetic member moves with the second magnetic member. The valve portion of the first magnetic member opens the communication passage to thereby connect the canister with the body of the tank. As a result, the fuel vapors inside the body of the tank are forced into the canister.

When the cover member is closed or installed in position, the first magnetic member moves in the reverse direction. As a result, the valve portion closes the communication passage.

In this novel fuel tank, the first magnetic member is disposed inside the filler tube, while the second magnetic member is disposed outside the filler tube. That is, the first and second magnetic members are completely isolated from each other by the filler tube. This dispenses with sealing against the fuel vapors, which would otherwise be needed when their relative movement is taken into account. Consequently, when the cover member is opened or taken off, the fuel vapors can be directed into the canister with improved reliability.

Also in this fuel tank, the mechanism for opening the communication passage makes use of the two magnetic members which attract or repel each other. Therefore, the tank is simple in structure and can be fabricated economically.

Other objects and features of the invention will appear in the course of the description thereof which follows.

DESCRIPTION OF THE PREFERRED EMBODIMENTS

Figure 1:
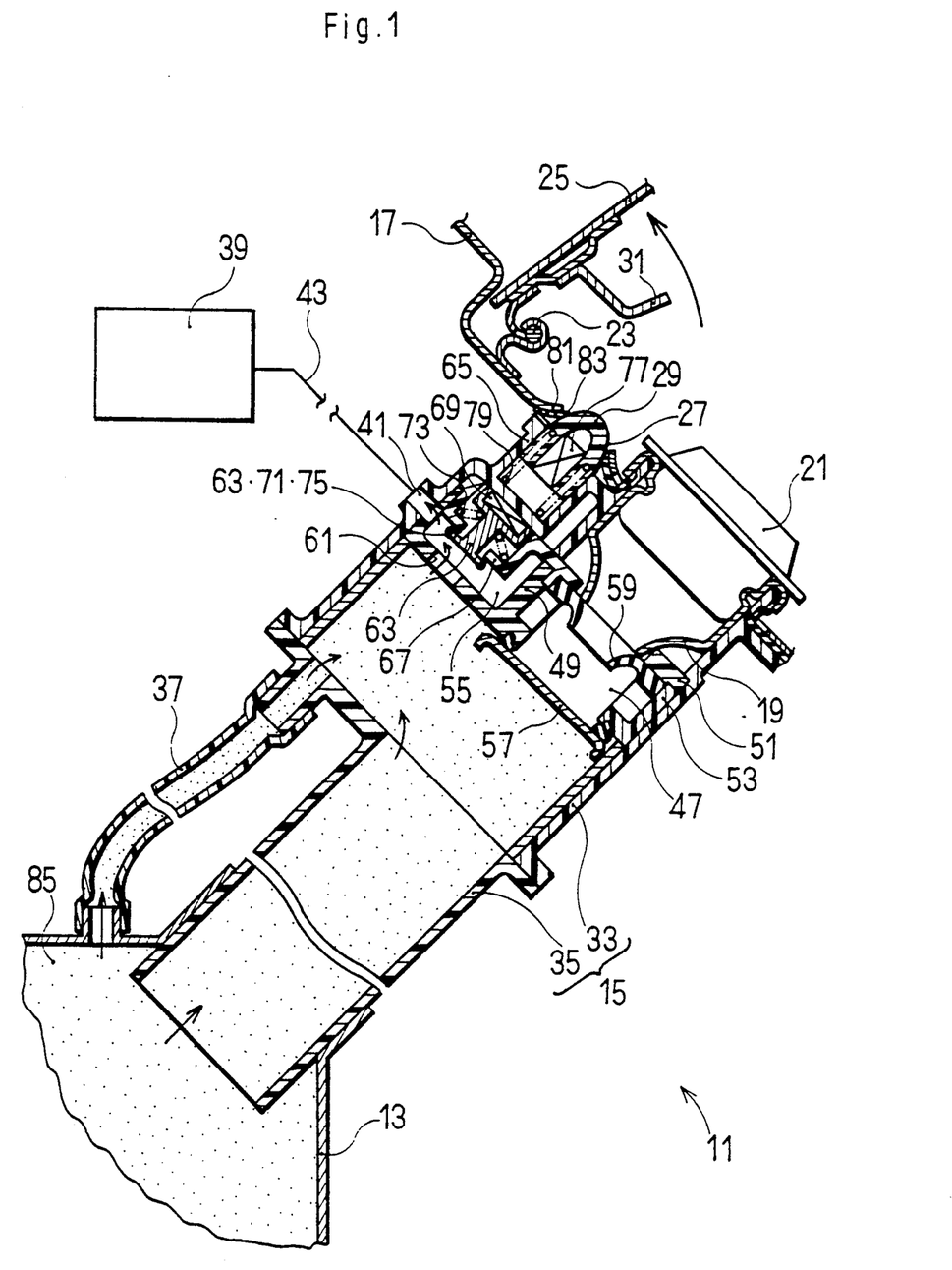
FIG. 1 is a cross-sectional view of a fuel tank according to the invention, and in which the filler lid has been taken off.
Figure 2:
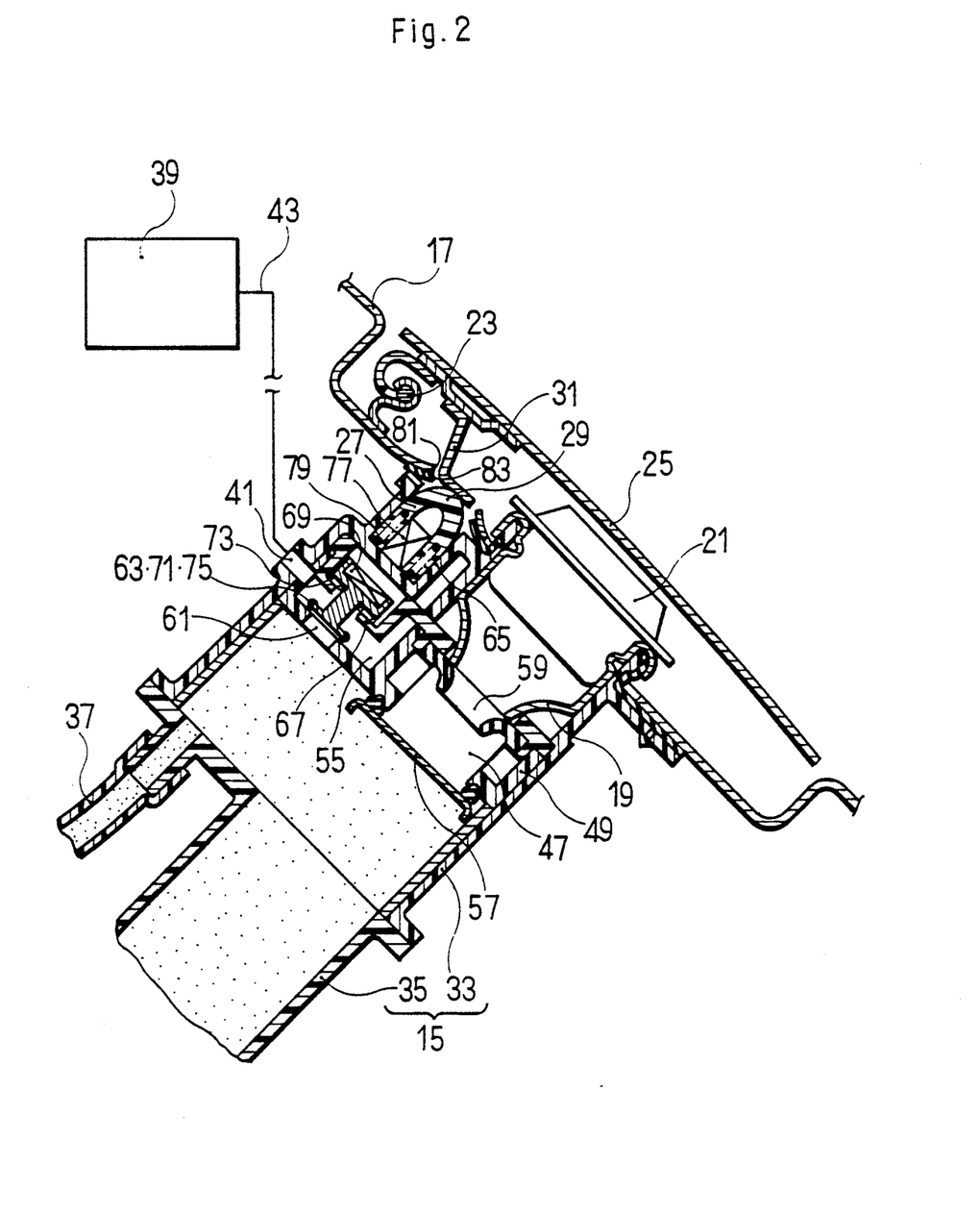
FIG. 2 is a cross-sectional view similar to FIG. 1, but in which the filler lid has been shut down.
Figure 3:
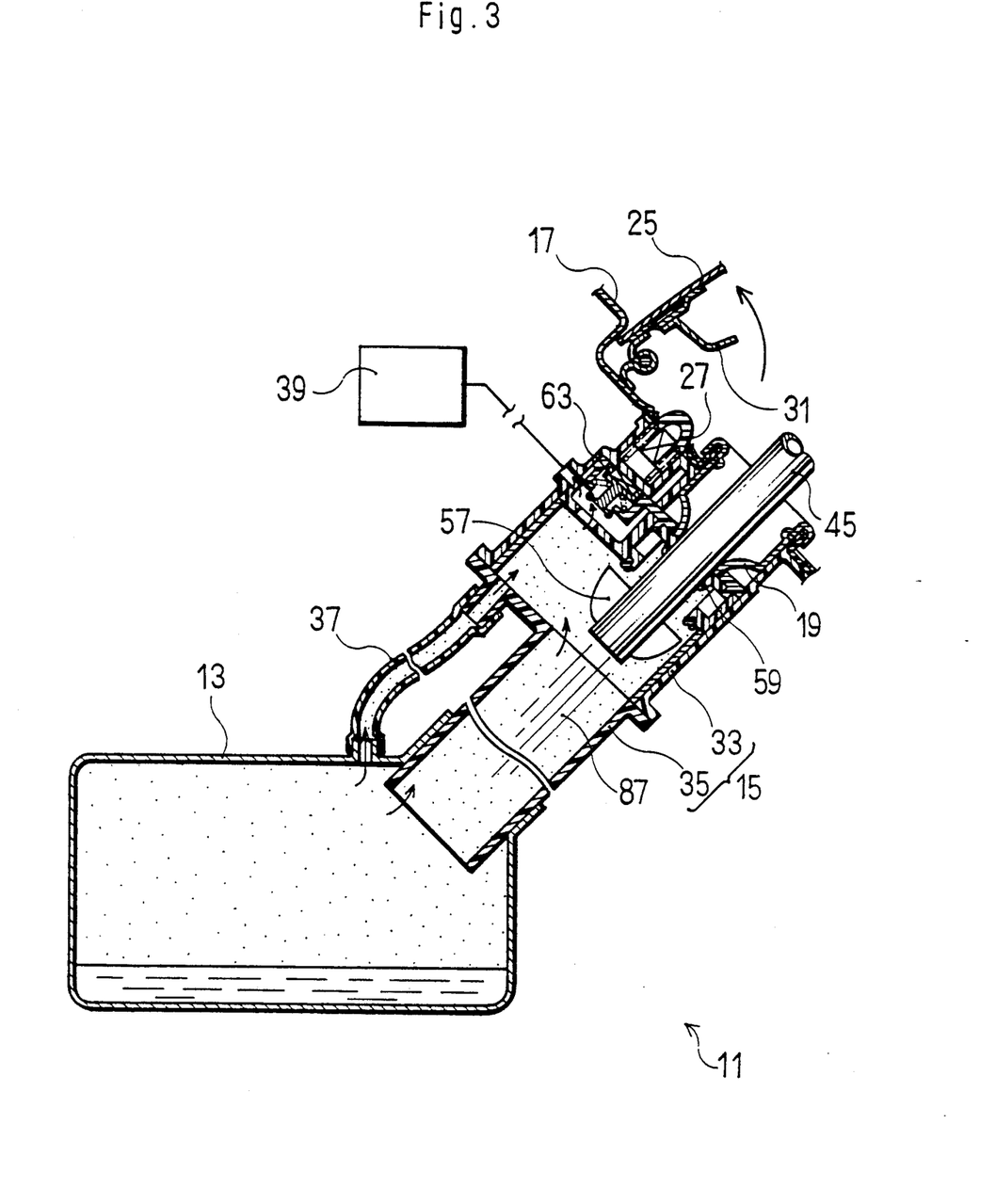
FIG. 3 is a cross-sectional view of the fuel tank shown in FIGS. 1 and 2, for showing the condition in which fuel is being supplied.

Referring to FIGS. 1–3, a fuel tank embodying the concept of the invention is generally indicated by reference numeral 11, the tank being installed in a vehicle such as an automobile. The body of the tank 11 is indicated by numeral 13. A filler tube 15 is mounted at the top of the body 13 of the tank. The body of the vehicle in which this fuel tank 11 is installed is indicated by numeral 17. A fuel injection port 19 is formed at the top of the filler tube 15 near the body 17 of the vehicle. A filler cap 21 is attached to the fuel injection port 19.

A filler lid 25 which covers the filler tube 15 is disposed around the fuel injection port 19. This lid 25 is rotatably held to the body 17 by a pivot pin 23. A pressing member 31 is rigidly fixed to the lid 25. A second magnetic member 27 has a depressed portion 29 (the depressed portion 29 is depressed by the pressing member 31) as described later. When the filler lid 25 is shut down, the pressing member 31 pushes down on the depressed portion 29. This filler lid 25 is urged to open by a torsion spring (not shown) mounted on the outer periphery of the pivot pin 23. The lid 25 is provided with an undercut (not shown). When the lid 25 is shut down, the surrounding body 17 engages the undercut to maintain the lid 25 shut down.

In the present embodiment, the filler tube 15 is divided into an upper portion 33 and a lower portion 35 both of which are made of a synthetic resin. A breather pipe 37 is disposed inside the lower portion 35 of the filler tube to place the top portion of the tank body 13 in communication with the upper portion 33 of the filler tube.

A communication passage 41 that is in communication with a charcoal canister 39 via a connection tube 43 is formed at one side of the upper portion 33 of the filler tube. An intermediate wall portion 49 which is made of a synthetic resin and faces the opening of the communication passage 41 is mounted within the upper portion 33 of the filler tube. The intermediate wall portion 49 is provided with a hole 47 extending through it. A fuel injection nozzle 45 can be inserted into this hole 47. This intermediate wall portion 49 consists of an upper member 51 and a lower member 53 which are coupled together. After the upper and lower members 51, 53 have been coupled together, the intermediate wall portion 49 forms a valve chamber 55 that is in communication with the communication passage 41. A trap door 57 opens when the fuel injection nozzle 45 is inserted. A nozzle seal 59 hermetically seals the inserted nozzle 45 to the inner surface of the hole 47 in the intermediate wall portion.

The valve chamber 55 is provided with a hole 61 extending through it. This hole 61 is located on the side of the body 13 of the tank. A first magnetic member 63 is mounted inside the valve chamber 55. In the illustrated embodiment, the valve chamber 55 is composed of the intermediate wall portion 49 and the wall portion of a receiving portion 65 (described later). The intermediate wall portion 49 has an annular spring seat 67 through which the first magnetic member 63 extends.

The first magnetic member 63 has a first permanent magnet 69 at the end located on the side of the filler lid 25. Further, the first magnetic member 63 has a valve portion 71 at the end located on the side of the body 13 of the tank, the valve portion 71 being capable of closing the hole 61 in the valve chamber 55. The first magnetic member 63 is biased toward the filler lid 25 by a coil spring 73 which is held to the spring seat 67. Indicated by numeral 75 is a seal.

The aforementioned receiving portion 65 is disposed outside the upper portion 33 of the filler tube above the valve chamber 55. This receiving portion 65 is made of a nonmagnetic material such as a synthetic resin and forms a substantially cylindrical space. The second magnetic member 27 is mounted inside the receiving portion 65. In the present embodiment, the receiving portion 65 is formed integrally with the upper portion 33 of the filler tube.

The second magnetic member 27 has a second permanent magnet 77 at the end on the side of the valve chamber 55. The first magnet 69 and the second magnet 77 repel each other. The second magnetic member 27 has the depressed portion 29 on the side of the filler lid 25. When the filler lid 25 is shut down, this depressed portion 29 is depressed by the pressing member 31. The second magnetic member 27 is biased toward the filler lid 25 by a coil spring 79.

A limiting wall portion 81 is formed on the receiving portion 65 on the side of the filler lid 25 to prevent the second magnetic member 27 from coming out of the receiving portion 65. A rubber seal 83 seals the upper portion 33 of the filler tube to the body 17. This seal 83 acts as a shock absorber only for the second magnetic member 27 at the location of the limiting wall portion 81.

The fuel tank 11 constructed as described above operates in the manner described now. When the filler lid 25 is shut down, the tank assumes the condition shown in FIG. 2. That is, the depressed portion 29 of the second magnetic member 27 is pressed against the pressing member 31 of the filler lid 25. Therefore, the second magnetic member 27 moves the second permanent magnet 77 toward the first permanent magnet 69 of the first magnetic member 63 against the biasing force of the coil spring 79. Then, the first permanent magnet 69 repels the second magnet 77. The resulting repulsive force moves the first magnetic member 63 toward the body 13 of the tank against the biasing force of the coil spring 73. In consequence, the valve portion 71 of the first magnetic member 63 brings the seal 75 into abutting engagement with the fringe of the hole 61. In this way, the valve portion 71 of the first magnetic member 63 closes the hole 61 extending through the valve chamber 55. The communication passage 41 that is in communication with the canister 39 is disconnected from the body 13 of the tank.

When fuel is supplied, the filler lid 25 is taken off. As shown in FIG. 1, the pressing member 31 is then moved away from the depressed portion 29 of the second magnetic member 27. The biasing force of the coil spring 79 moves the second magnetic member 27 away from the valve chamber 55. That is, the repulsive force between the first permanent magnet 69 and the second permanent magnet 77 weakens. The biasing force of the coil spring 73 causes the first magnetic member 63 inside the valve chamber 55 to move the valve portion 71 away from the fringe of the hole 61. As a result, the hole 61 extending through the valve chamber 55 is opened. This places the body 13 of the tank in communication with the canister 39 via both communication passage 41 and hole 61. Consequently, the fuel vapors 85 inside the tank body 13 are carried into the canister 39.

Subsequently, the filler cap 21 is removed, the fuel injection nozzle 45 is inserted from the fuel injection port 19, and liquid fuel 87 is supplied. At this time, the fuel vapors 85 are forced into the canister 39 through the hole 61, the communication passage 41, and the connection tube 43, depending on the amount of the oil supplied.

In the fuel tank 11 of this structure, escape of the fuel vapors 85 into the atmosphere can be prevented after the fuel injection nozzle 45 has been inserted as well as when it is being inserted. In particular, the trap door 57 is located in the bottom of the fuel injection port 19 until the nozzle 45 is inserted into the injection port 19 subsequent to removal of the filler cap 21. This door 57 prevents the escape of the fuel vapors 85 into the atmosphere. When the injection nozzle 45 is inserted, the trap door 57 is pushed open by the nozzle 45 but the nozzle seal 59 seals the nozzle 45 to the inner surface of the hole 47 in the intermediate wall portion 49. The upper portion 33, the lower portion 35 of the filler tube, the intermediate wall portions 49, and its constituting members 51, 53 are welded and sealed together. Consequently, during supply of fuel, escape of the fuel vapors 85 into the atmosphere through these joints is prevented.

After the supply of fuel ends, the fuel injection nozzle 45 is withdrawn from the fuel injection port 19. Then, the filler cap 21 is placed in position. The filler lid 25 is shut down. This condition is shown in FIG. 2. Under this condition, the communication passage 41 is closed off as described previously.

In this fuel tank 11, therefore, the mechanism for opening the communication passage 41 is composed of the first magnetic member 63 and the second magnetic member 27, i.e., the two permanent magnets 69 and 77. Hence, this fuel tank 11 can be fabricated economically. Also, for this tank 11, it is not necessary to take account of the sealing against the escape of the fuel vapors 85, unlike the construction using a wire. Therefore, when the filler lid 25 is taken off, the fuel vapors 85 can be carried into the canister 39 with improved reliability.

Figure 4:
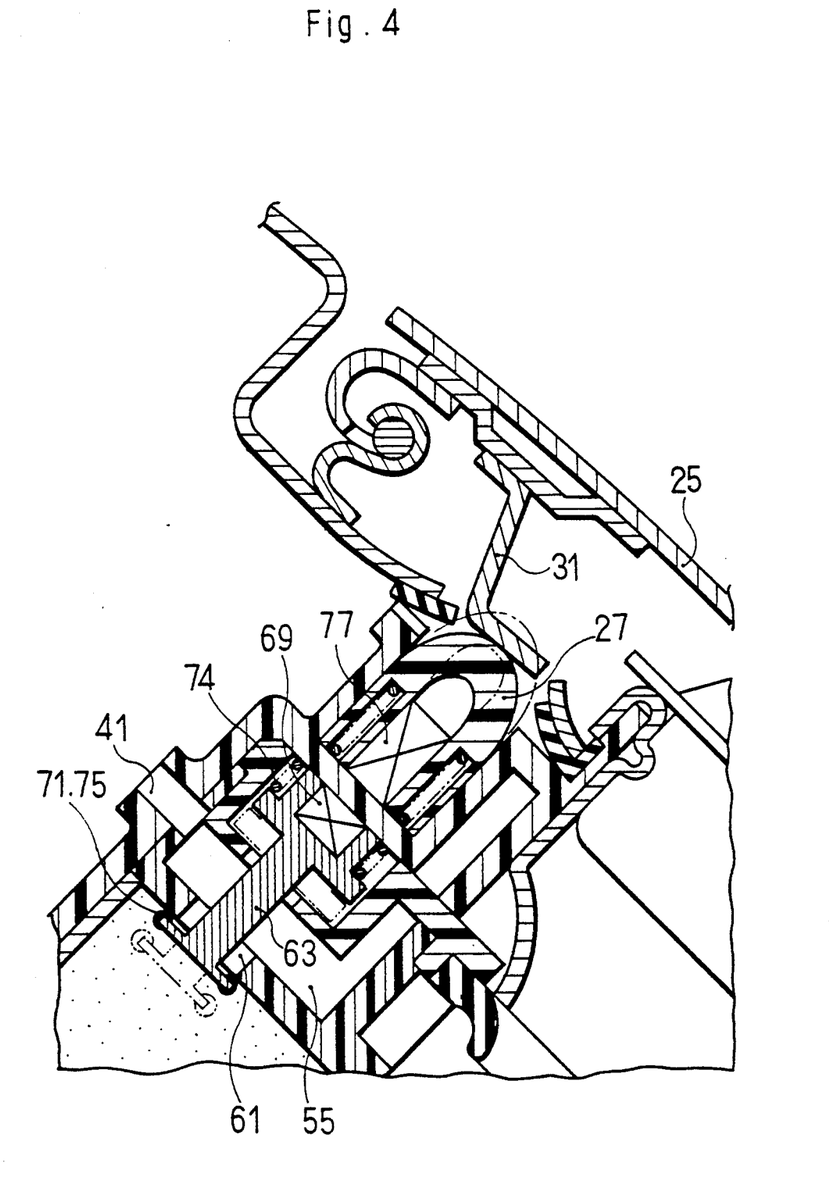
FIG. 4 is a fragmentary cross section of a modification of the fuel tank shown in FIGS. 1-3.

In the present embodiment, the first magnetic member 63 and the second magnetic member 27 repel each other. It is also possible that two magnetic members attracting each other are provided. For example, as shown in FIG. 4, the first magnetic member 63 is mounted inside the valve chamber 55 and kept away from the filler lid 25 by a coil spring 74. The first permanent magnet 69 is positioned inside the valve chamber 55. Under this condition, the valve portion 71 is caused to protrude from the hole 61. In this structure, when the second magnetic member 27 approaches the first magnetic member 63, the fringe of the hole 61 on the side of the tank body 13 is closed by the valve portion 71. When the second magnetic member 27 moves away from the first magnetic member 63, the hole 61 is opened.

Where the first and second magnetic members attract each other as described above, one of the permanent magnets 69, 77 of the first and second magnetic members 63, 27 can be replaced by a member made of a magnetic material such as iron.

Figure 5:
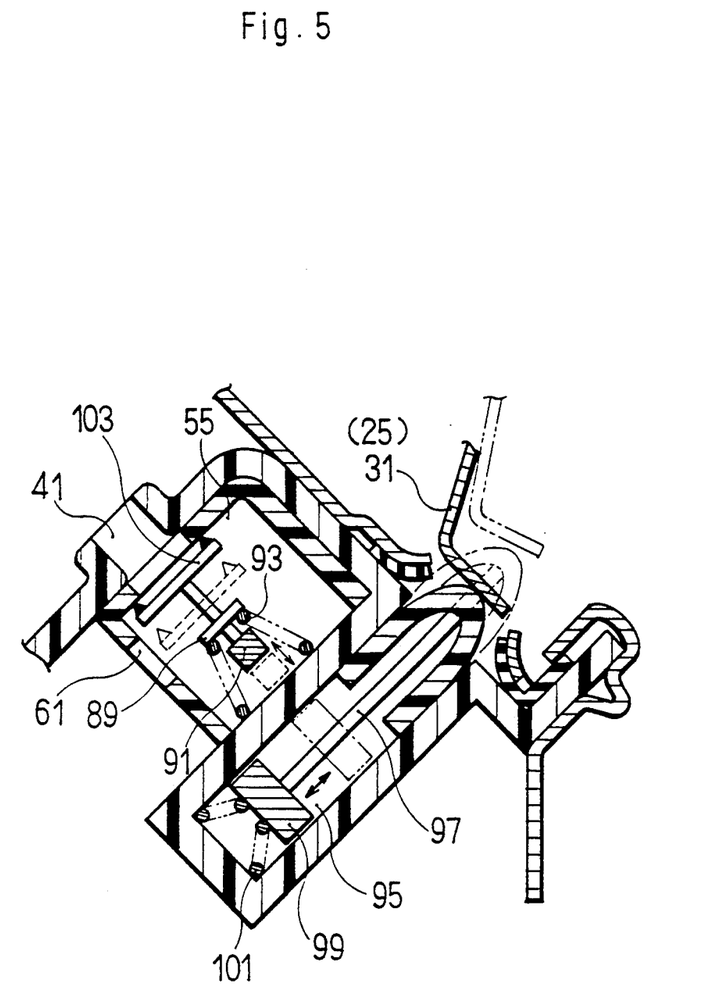
FIG. 5 is a fragmentary cross section of another modification of the fuel tank shown in FIGS. 1-3.

In the above embodiment, the direction of movement of the first magnetic member 63 substantially coincides with the direction of movement of the second magnetic member 27. The structure shown in FIG. 5 can also be adopted. In FIG. 5, a first magnetic member 89 has a magnetic member 91 made of iron or other similar material. The first magnetic member 89 is biased away from a receiving portion 95 by a coil spring 93. A second magnetic member 97 has a permanent magnet 99.

In this embodiment, when the second magnetic member 97 is depressed by the pressing member 31 of the filler lid 25, the communication passage 41 is closed. When the lid 25 is taken off, the second magnetic member 97 is moved upward by the biasing force of a coil spring 101. It follows that the permanent magnet 99 is brought close to the magnetic member 91 of the first magnetic member 89. Therefore, the first magnetic member 89 is moved with a valve portion 103 against the biasing force of the coil spring 93. The result is that the communication passage 41 is opened.

Figure 6:
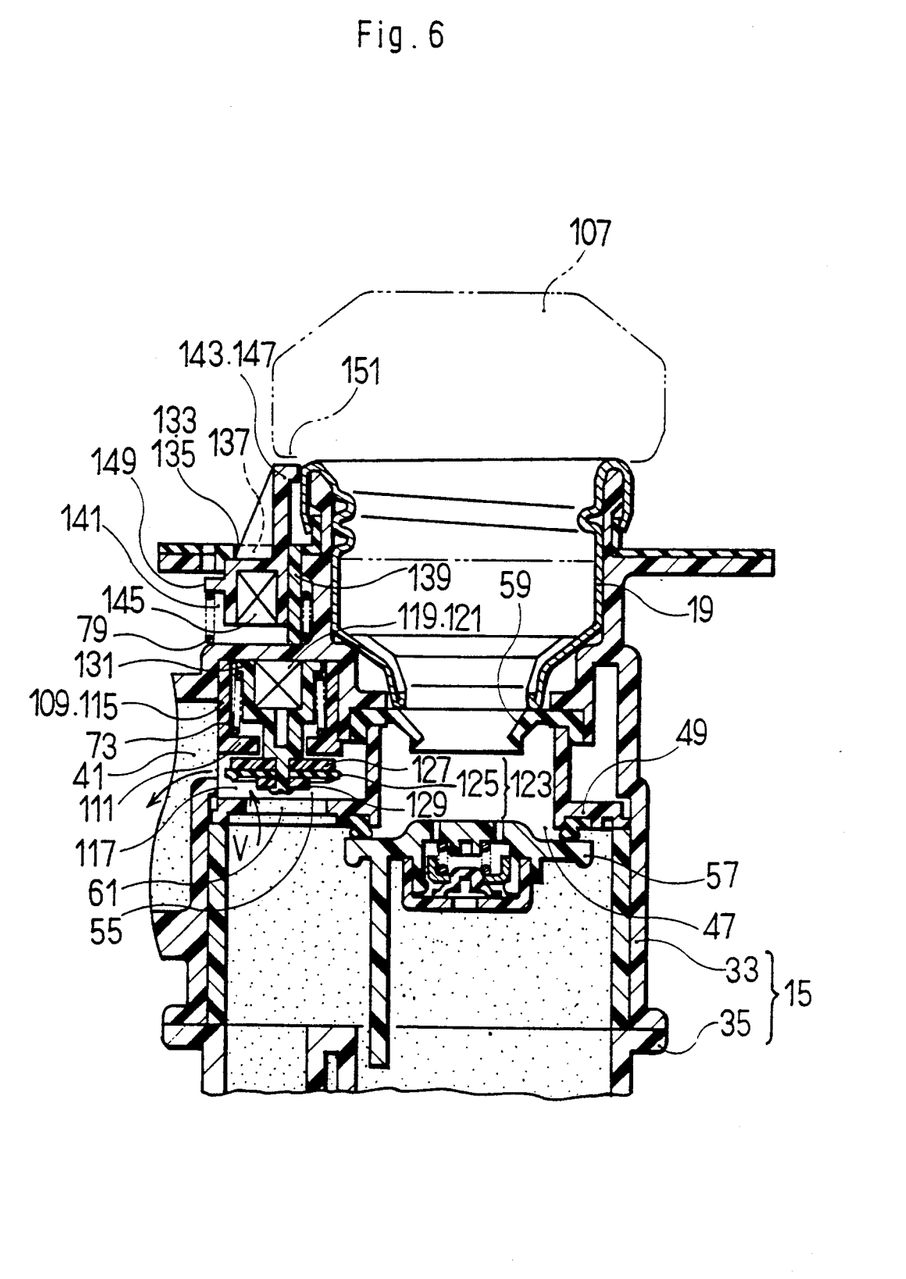
FIG. 6 is a cross-sectional view of another fuel tank according to the invention, and in which the filler cap has been taken off.
Figure 7:
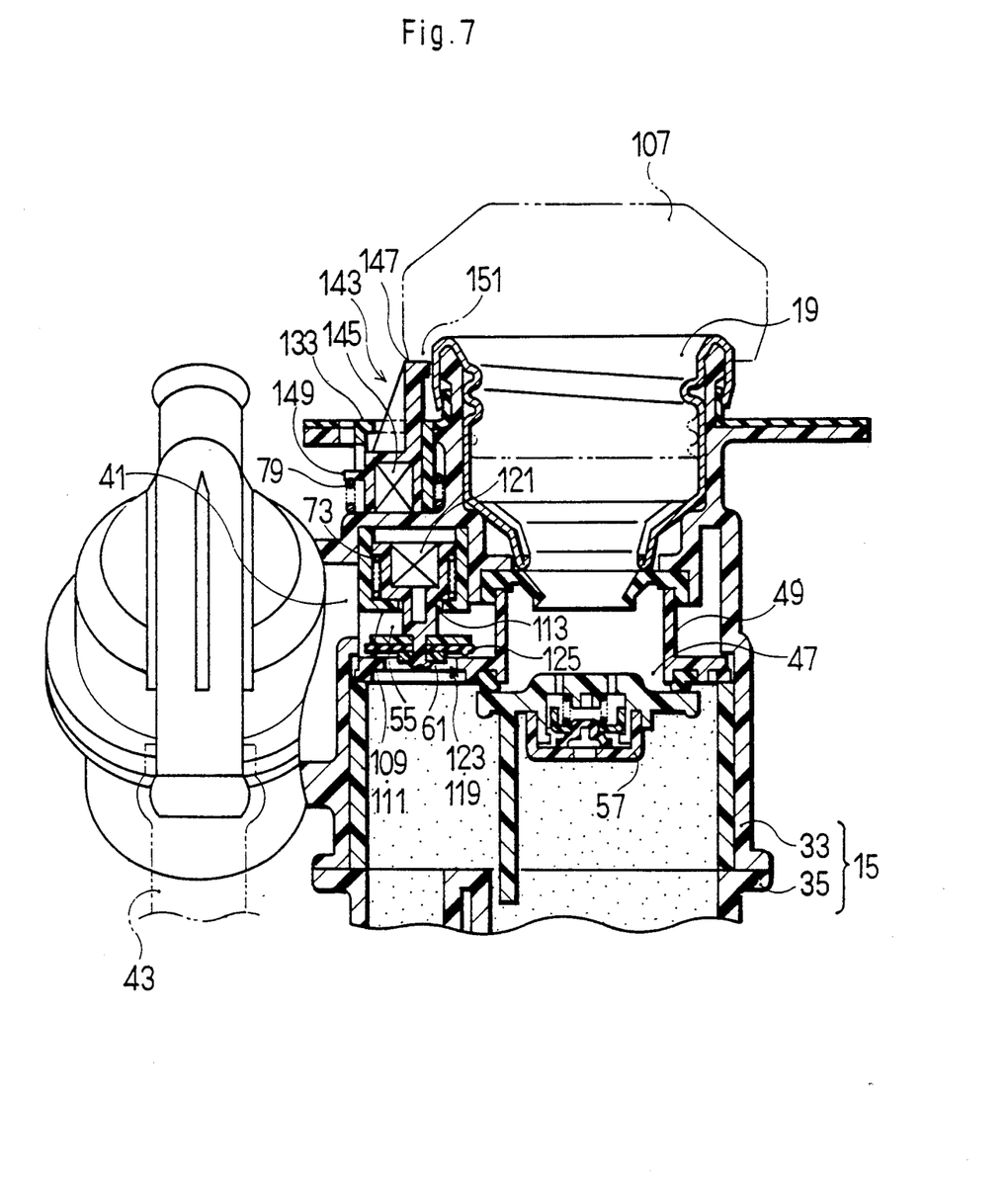
FIG. 7 is a cross-sectional view similar to FIG. 6, but in which the filler cap has been shut down.
Figure 8:
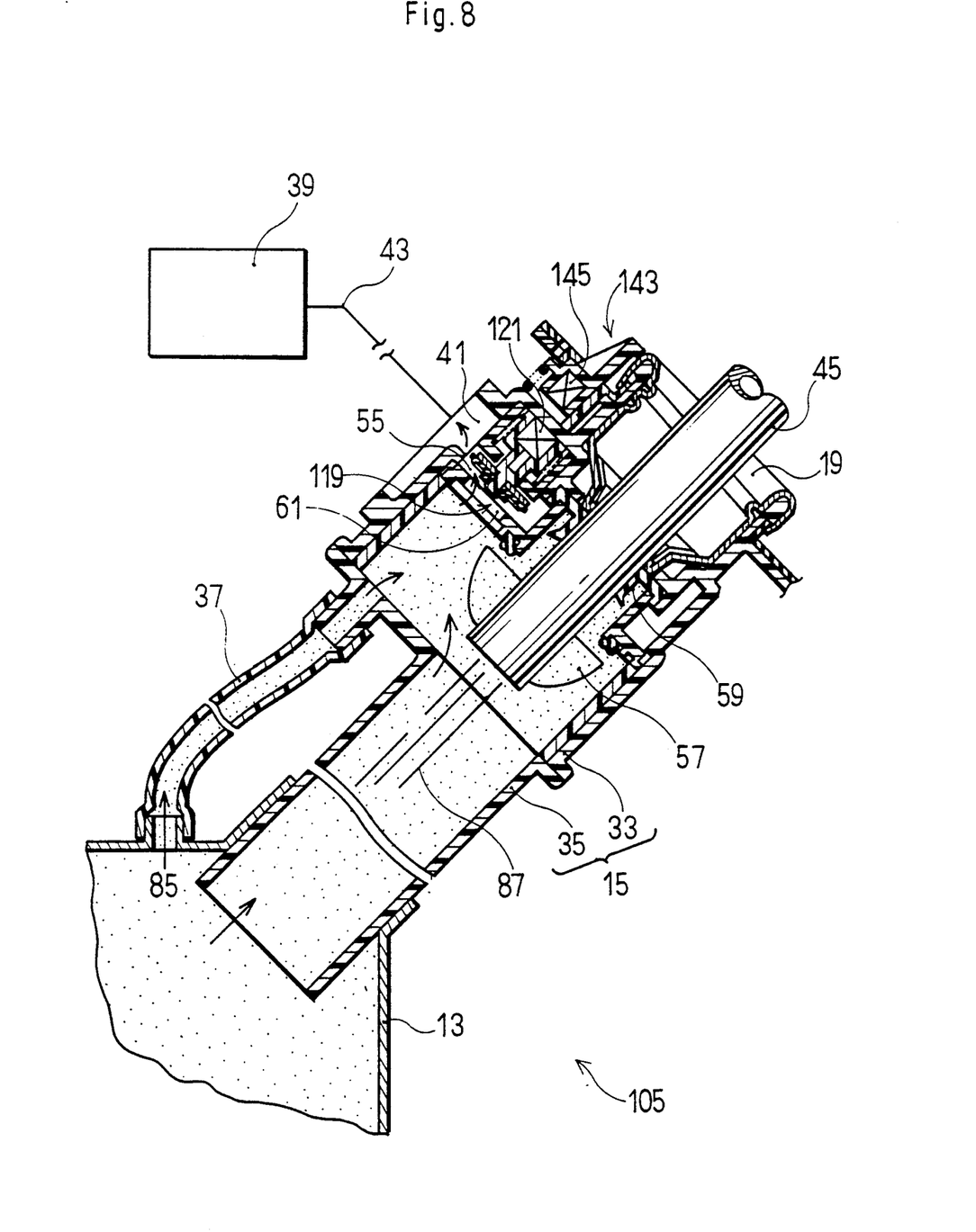
FIG. 8 is a cross-sectional view of the fuel tank shown in FIGS. 6 and 7, for showing the condition in which fuel is being supplied.

Referring next to FIGS. 6-8, there is shown another fuel tank, indicated by 105, installed in a vehicle. This tank forms a second embodiment of the invention. This tank uses a filler cap 107 as a cover member that opens a communication passage 41. This tank 105 has a filler tube 15 disposed at the top of the body 13 of the tank, in the same manner as in the first embodiment. A fuel injection port 19 is formed at the top of the filler tube 15. The filler cap 107 is mounted in the injection port 19.

In the present embodiment, the filler tube 15 is divided into an upper portion 33 and a lower portion 35 both of which are made of a nonmagnetic synthetic resin. A breather pipe 37 is disposed inside the lower portion 35 of the filler tube to place the top portion of the tank body 13 in communication with the upper portion 33 of the filler tube.

The communication passage 41 that is in communication with a charcoal canister 39 via a connection tube 43 is formed at one side of the upper portion 33 of the filler tube. An intermediate wall portion 49 made of a synthetic resin is held inside the upper portion 33 of the filler tube 15. The intermediate wall portion 49 is provided with a hole 47 extending through it, the hole 47 being located at the position of the opening of the communication passage 41. A fuel injection nozzle 45 can be inserted into the hole 47. The intermediate wall portion 49 is also provided with a hole 61 extending through it. This hole 61 is in communication with a valve chamber 55. A trap door 57 has a positive pressure valve which opens when the nozzle 45 is inserted. A nozzle seal 59 seals the inserted nozzle 45 to the inner surface of the hole 47.

The valve chamber 55 is formed above the hole 61 on the fringe of the opening of the communication passage 41. The valve chamber 55 comprises the intermediate wall portion 49 and the wall portion of the upper portion 33 of the filler tube. A first magnetic member 119 and a spring seat 109 are mounted inside the valve chamber 55. A coil spring 73 for biasing the first magnetic member 119 upward is held by the spring seat 109.

The spring seat 109 is substantially cylindrical in shape and made of a nonmagnetic synthetic resin. The seat 109 has a partition wall 111 at a vertically intermediate position. The partition wall 111 has a hole 113 extending through it. The seat further has a peripheral wall portion 115 which extends upward from the partition wall 111 and bears against the wall portion of the upper portion 33 of the filler tube. This peripheral wall portion 115 is welded to the upper portion 33 of the filler tube.

The first magnetic member 119 is so mounted that it extends vertically through the hole 113 in the spring seat 109. A first permanent magnet 121 is mounted at the upper end of the first magnetic member 119. The first magnetic member 119 also has a valve portion 123 at the lower end of the hole 61, the valve portion 123 being capable of closing the hole 61. The valve portion 123 has a seal portion 125 that is a resilient body made of rubber. The seal portion 125 is held between holding plates 127 and 129. The seal portion 125 seals the fringe of the hole 61. The first magnetic member 119 has an upper flange 131 against which the coil spring 73 bears, to bias the first magnetic member 119 upward at all times. The lower end of the coil spring 73 is held to the partition wall 111 of the spring seat 109.

A substantially cylindrical receiving portion 133 made of a nonmagnetic synthetic resin is fixedly mounted outside the upper portion 33 of the filler tube above the valve chamber 55. A second magnetic member 143 is housed in the receiving portion 133. The substantially cylindrical receiving portion 133 comprises an upper wall 135 and a peripheral wall 139 extending downward from the fringe of the upper wall 135. The upper wall 135 is provided with a hole 137 extending through it. This hole 137 takes a T-shaped from as viewed from above. The peripheral wall 139 is provided with plural slits 141 extending vertically.

The second magnetic member 143 has a second permanent magnet 145 at the lower end of the valve chamber 55. The second permanent 145 repels the first permanent magnet 121. The second magnetic member 143 has a depressed portion 147 at its upper end. The depressed portion 147 protrudes upwardly from the hole 137 extending through the upper wall 135 of the receiving portion 133. The depressed portion 147 can bear against the flange 151 of the filler cap 107 installed in the fuel injection port 19. The second magnetic member 143 has a cross beam portion 149 at a vertically intermediate position, the beam portion extending horizontally from the slits 141 in the cylindrical receiving portion 133. A coil spring 79 bears against the lower surface of the cross beam portion 149, so that the second magnetic member 143 is biased upwardly at all times. The lower end of the coil spring 79 abuts against the outer surface of the upper portion 33 of the filler tube.

The fuel tank 105 constructed as described above operates in the manner described now. When the filler cap 107 is mounted in position, the condition shown in FIG. 7 is assumed. That is, the depressed portion 147 of the second magnetic member 143 is pressed against the flange 151 of the filler cap 107. The second magnetic member 143 moves the second permanent magnet 145 toward the first permanent magnet 121 of the first magnetic member 119 against the biasing force of the coil spring 79.

The first permanent magnet 121 repels the second permanent magnet 145. The repulsive force between both magnets moves the first magnetic member 119 toward the body 13 of the tank against the biasing force of the spring 73. The valve portion 123 of the first magnetic member 119 causes the seal portion 125 to bear against the fringe of the hole 61. The valve portion 123 closes the hole 61 in the valve chamber 55. The communication passage 41 that is in communication with the canister 39 is disconnected from the body 13 of the tank.

When fuel is supplied, the filler cap 107 is removed. The condition shown in FIG. 6 is taken up. That is, the flange 151 of the cap 107 moves away from the depressed portion 147 of the second magnetic member 143. Since the downward depressing force of the depressed portion 147 is released, the second magnetic member 143 is moved upward away from the valve chamber 55 by the biasing force of the coil spring 79. Thus, the repulsive force between the first permanent magnet 121 and the second permanent magnet 145 weakens. The biasing force of the spring 73 causes the first magnetic member 119 inside the valve chamber 55 to move the valve portion 123 away from the fringe of the hole 61. As a result, the hole 61 extending through the valve chamber 55 is opened. The canister 39 is placed in communication with the body 13 of the tank via both communication passage 41 and hole 61. Consequently, the fuel vapors 85 inside the body 13 of the tank are directed into the canister 39. Thereafter, as shown in FIG. 8, a fuel injection nozzle 45 is inserted from the fuel injection port 19, and liquid fuel 87 is supplied.

This fuel tank 105 can prevent escape of the fuel vapors 85 into the atmosphere when the nozzle 45 is being inserted as well as during the insertion of the nozzle. Specifically, the trap door 57 is located in the bottom of the fuel injection port 19 until the filler cap 107 is removed and the fuel injection nozzle 45 is inserted into the fuel injection port 19. Therefore, this door 57 prevents the escape of the fuel vapors 85 into the atmosphere. When the nozzle 45 is inserted, the trap door 57 is pushed open by the nozzle 45. However, the nozzle seal 59 seals the nozzle 45 to the inner surface of the hole 47 extending through the intermediate wall portion 49. The upper portion 33, the lower portion 35 of the filler tube, and the intermediate wall portion 49 are welded and sealed together. Consequently, during supply of fuel, escape of the fuel vapors 85 into the atmosphere through these joints is prevented.

After the supply of fuel ends, the fuel injection nozzle 45 is withdrawn from the fuel injection port 19. Then, the filler cap 107 is tightened around the fuel injection port 19. This condition is shown in FIG. 7. Under this condition, the communication passage 41 is closed off as described previously.

In this way, in the fuel tank 105, the mechanism for opening the communication passage 41 uses the first magnetic member 119 and the second magnetic member 143, i.e., the two permanent magnets 121 and 145. Therefore, the tank 105 can be fabricated economically. Also, for this fuel tank 105, it is unnecessary to take account of the sealing against the fuel vapors 85, unlike the conventional control valve for opening and closing the passage. Hence, the fuel vapors 85 can be carried into the canister 39 with improved reliability when the filler cap 107 is opened.

Figure 9:
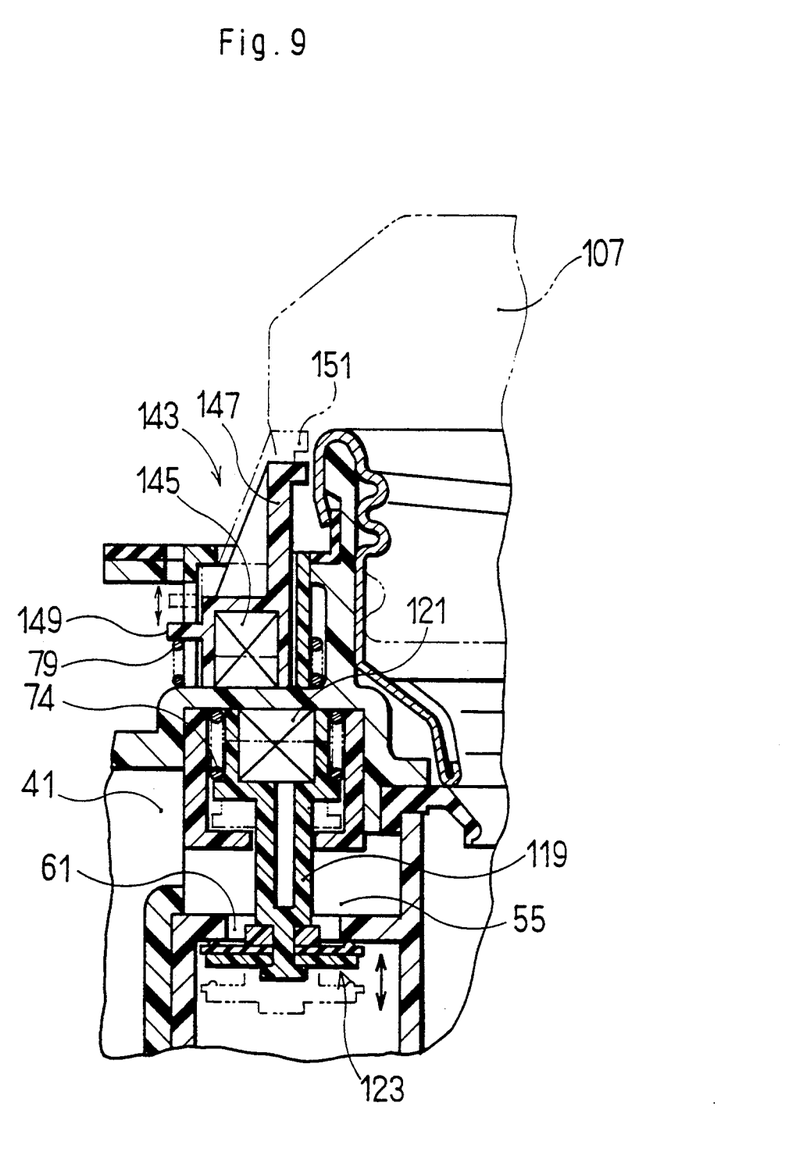
FIG. 9 is a fragmentary cross section of a modification of the fuel tank shown in FIGS. 6–8.

In the above embodiment, the first magnetic member 119 and the second magnetic member 143 repel each other. As shown in FIG. 9, two magnetic members attracting each other can also be utilized. Specifically, the first magnetic member 119 is urged downward by a coil spring 74. The valve portion 123 is made to protrude from the hole 61 while the first permanent magnet 121 is placed inside the valve chamber 55. In this case, when the second magnetic member 143 is close to the first magnetic member 119, the attractive force between them moves the first magnetic member 119 upwardly against the biasing force of the coil spring 74. The fringe of the hole 61 on the side of the body 13 of the tank is closed by the valve portion 123. On the other hand, when the second magnetic member 143 moves away from the first magnetic member 119, the attractive force between them weakens. Then, the biasing force of the spring 74 moves the first magnetic member 119 downwardly. The hole 61 is opened.

Where the first and second magnetic member 119, 143, respectively, are designed to attract each other as described above, one of the permanent magnets 121, 145 of the first and second magnetic members 119, 143 can be replaced by a member made of a magnetic material such as iron.

In the above embodiment, the direction of movement, i.e., vertical movement, of the first magnetic member 119 is identical with the direction of movement of the second magnetic member 143. It is also possible to move the first magnetic member 119 horizontally according to the position of the opening of the communication passage 41, utilizing the repulsive or attractive force between the first and second magnetic members 119, 143.

As the present invention may be embodied in several forms without departing from the spirit of essential characteristics thereof, the above embodiments are therefore illustrative and not restrictive, since the scope of the invention is defined by the appended claims rather than by the description preceding them, and all changes that fall within the meets and bounds of the claims, or equivalence of such meets and bounds are therefore intended to be embraced by the claims.

What is claimed is:

1. A fuel tank for use in a vehicle comprising:
   a fuel tank body having a hole disposed at a first end thereof;
   a magnet housing disposed on said first end of said fuel tank body so as to communicate therewith through said hole;
   a filler tube adapted to receive a fuel nozzle, said filler tube being distinct from said magnet housing;
   a communications passage connected with said filler tube;
   a filler lid that is rotatably connected to the vehicle, said filler lid adapted to cover said filler tube and said magnetic housing when said filler lid is disposed in a closed position;
   a first magnet disposed in said magnet housing;
   a second magnet disposed in said magnet housing; and
   a valve actuated by said first magnet;
   wherein said filler lid is adapted to push said magnet housing and thus move said second magnet toward said first magnet when said filler lid is being moved to said closed position;
   wherein movement of said second magnet produces a magnetic force on said first magnet, said first magnet thus moves and actuates said valve so as to close said communication passage and said hole.

2. A fuel tank for use in a vehicle comprising:
   a fuel tank body having a hole disposed at a first end thereof;
   a magnet housing disposed on said first end of said fuel tank body so as to communicate therewith through said hole;
   a filler tube adapted to receive a fuel nozzle, said filler tube being distinct from said magnet housing;
   a communications passage connected with said filler tube;
   a filler cap adapted to cover said filler tube;
   a first magnet disposed in said magnet housing;
   a second magnet disposed in said magnet housing; and
   a valve actuated by said first magnet;
   wherein said filler cap is adapted to push said magnet housing as it moves into a fully closed position and thus move said second magnet;
   wherein movement of said second magnet produces a repellent force on said first magnet, said first magnet thus moves and actuates said valve so as to close said communication passage and said hole.

3. The fuel tank of claim 1 or 2, wherein each of said first and second magnetic members is equipped with a permanent magnet.

4. The fuel tank of claim 1 or 2, wherein only one of said first and second magnetic members is equipped with a permanent magnet.

5. The fuel tank of claim 1 or 2, wherein
   (A) said first and second magnetic members are so polarized that they repel each other;
   (B) said first magnetic member is so biased by a biasing means as to keep said communication passage open;
   (C) when said second magnetic member approaches the first magnetic member, the repulsive force between these two magnetic members causes the first magnetic member to close the communication passage against the force of the biasing means; and
   (D) when said second magnetic member moves away from the first magnetic member, the biasing means causes the first magnetic member to open the communication passage.

6. The fuel tank of claim 1 or 2, wherein
   (A) said first and second magnetic members are so polarized that they attract each other;
   (B) said first magnetic member is so biased by a biasing means as to keep said communication passage open;
   (C) when said second magnetic member approaches the first magnetic member, the attractive force between these two magnetic members causes the first magnetic member to close the communication passage against the force of the biasing means; and
   (D) when said second magnetic member moves away from the first magnetic member, the biasing means causes the first magnetic member to open the communication passage.

7. The fuel tank of claim 1 or 2, wherein the direction of movement of said first magnetic member is substantially coincident with the direction of movement of said second magnetic member such that the first and second magnetic members move substantially along a straight line.

8. The fuel tank of claim 1 or 2, wherein the direction of movement of said first magnetic member is substantially perpendicular to the direction of movement of said second magnetic member.

* * * * *